United States Patent [19]

Lee

[11] Patent Number: 5,780,079

[45] Date of Patent: Jul. 14, 1998

[54] APPARATUS FOR MOLDING A CONNECTOR

[75] Inventor: Ho-kyung Lee, Incheon, Rep. of Korea

[73] Assignee: Daewoo Telecom Ltd., Rep. of Korea

[21] Appl. No.: 688,123

[22] Filed: Jul. 29, 1996

[30] Foreign Application Priority Data

Aug. 1, 1995 [KR] Rep. of Korea ............ 95-23729

[51] Int. Cl.$^6$ .................... B29C 33/30; B29C 33/32
[52] U.S. Cl. ............. 425/577; 249/64; 249/177; 264/1.25; 425/3; 425/186; 425/192 R; 425/468; 425/DIG. 30; 425/DIG. 33
[58] Field of Search ................. 425/3, 192 R, 425/577, 468, DIG. 30, DIG. 33, 186; 264/1.25, 328.12; 249/63, 64, 176, 177

[56] References Cited

U.S. PATENT DOCUMENTS

| 742,192 | 10/1903 | Hoyt | 425/468 |
|---|---|---|---|
| 1,905,897 | 4/1933 | Cahill | 249/64 |
| 3,384,335 | 5/1968 | Schwarz | 249/176 |
| 3,910,748 | 10/1975 | Kopernik | 425/DIG. 33 |
| 4,711,752 | 12/1987 | Deacon et al. | 425/468 |
| 4,753,515 | 6/1988 | Sato et al. | 264/1.25 |
| 5,013,495 | 5/1991 | Noba et al. | 264/1.25 |
| 5,252,280 | 10/1993 | Motisi | 264/161 |
| 5,269,998 | 12/1993 | Takagi et al. | 425/577 |
| 5,312,577 | 5/1994 | Peterson et al. | 425/577 |
| 5,439,370 | 8/1995 | Lalaouna et al. | 425/546 |

FOREIGN PATENT DOCUMENTS

| 0 349 460 | 1/1990 | European Pat. Off. . | |
|---|---|---|---|
| 0 514 923 | 11/1992 | European Pat. Off. . | |
| 931194 | 2/1948 | France | 425/468 |
| 59-109010 | 6/1984 | Japan | 264/1.25 |
| 61-134211 | 6/1986 | Japan | 425/577 |
| 2 276 583 | 10/1994 | United Kingdom . | |

*Primary Examiner*—Jay H. Woo
*Assistant Examiner*—Joseph Leyson
*Attorney, Agent, or Firm*—Pennie & Edmonds LLP

[57] ABSTRACT

An apparatus for molding a connector includes a stationary body, a moving body, a first and a second blocks detachably fixed to the moving body, and a core block having at least one core. The first block has at least one hole and the second block has at least one through-hole corresponding to the first hole. When the molding apparatus is closed, the stationary body, the moving body, and the first and the second blocks cooperate to define a cavity which will be filled with a molten plastic material and a leading end of the core fits through the through-hole of the second block and into the hole of the first block.

10 Claims, 14 Drawing Sheets

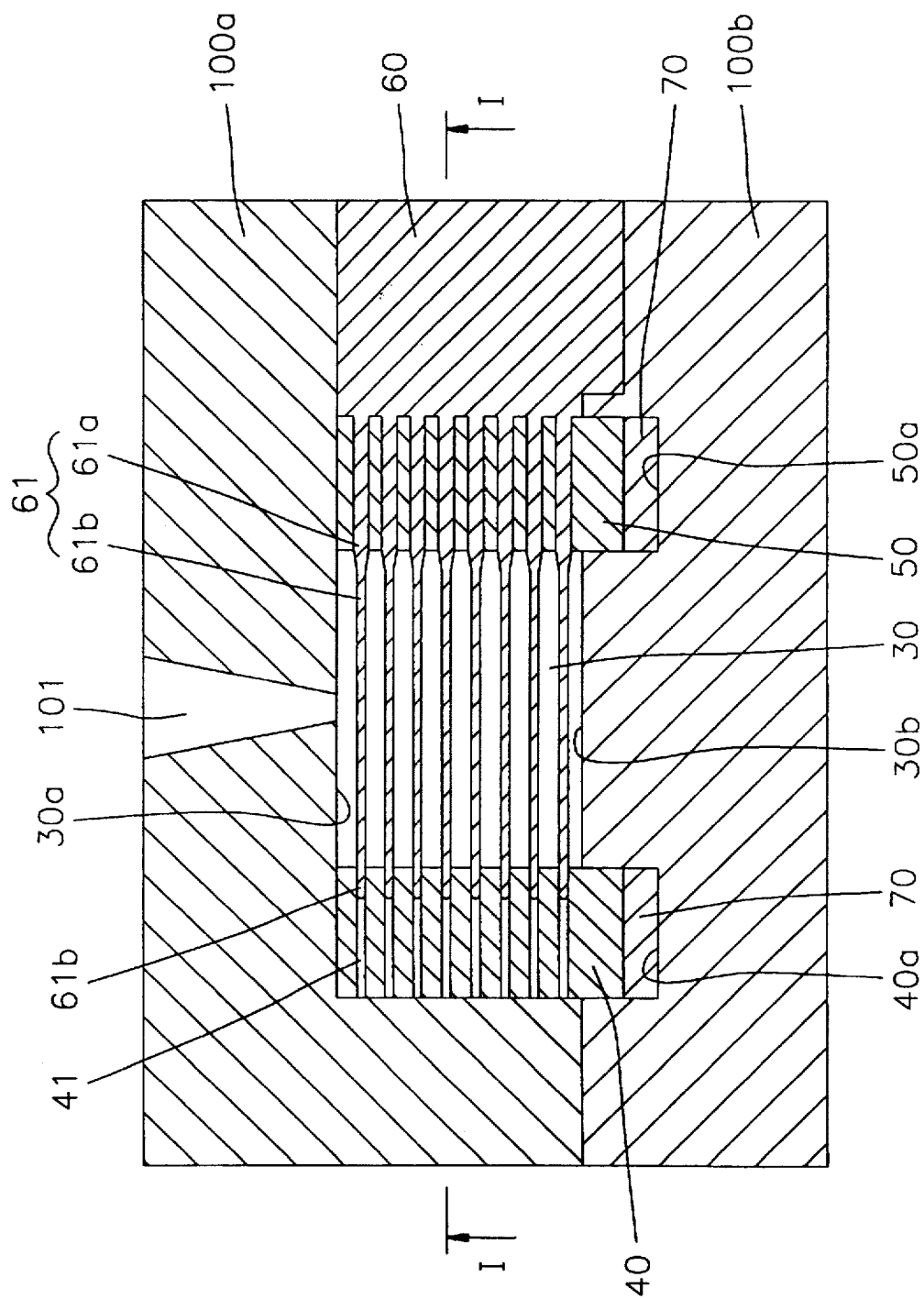

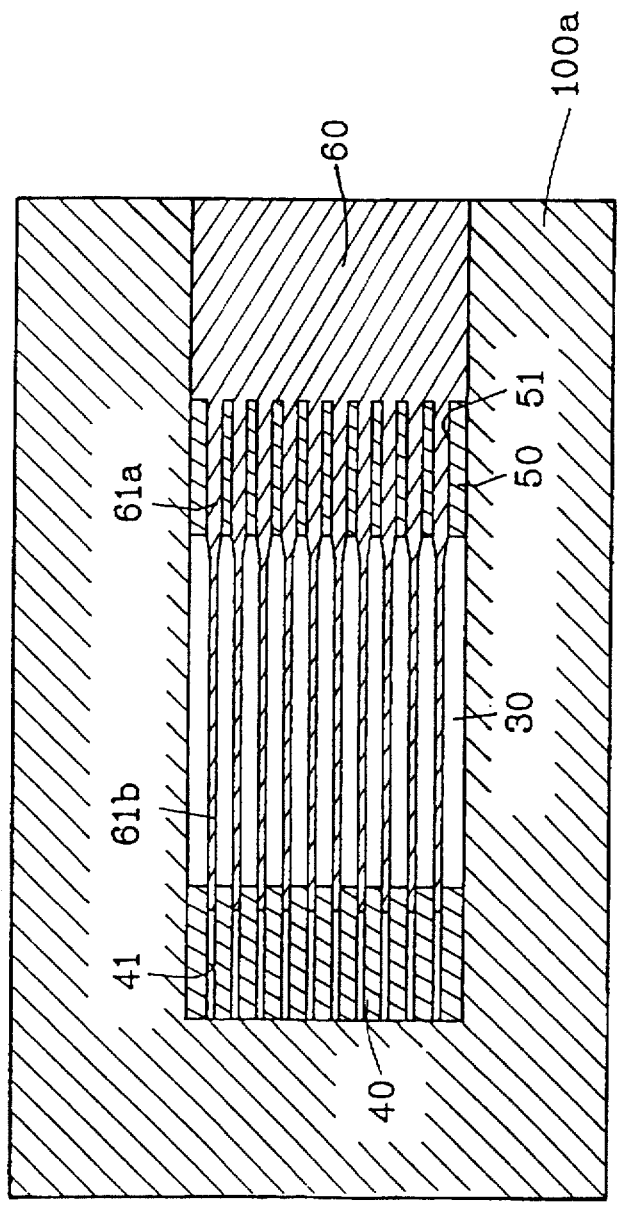

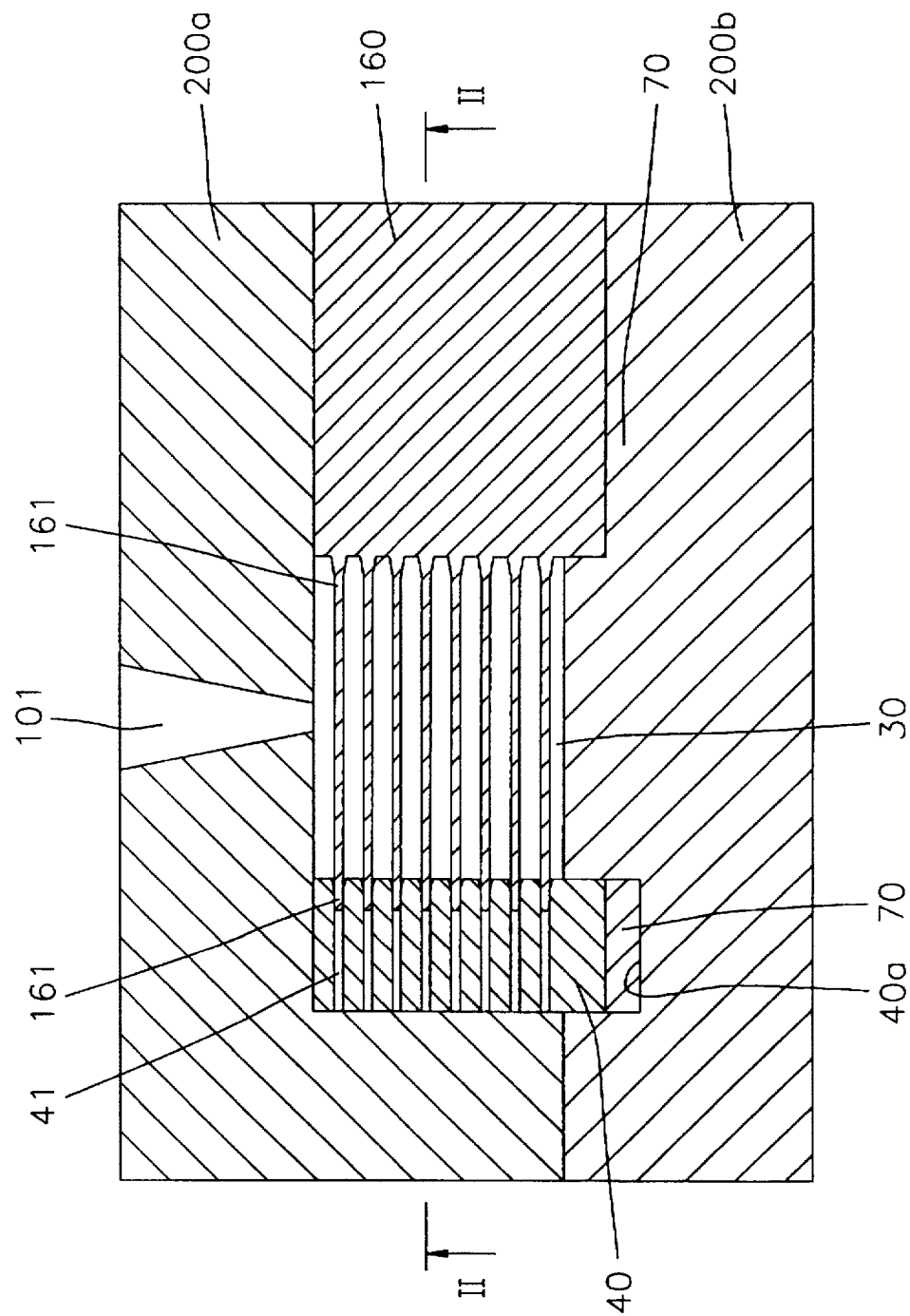

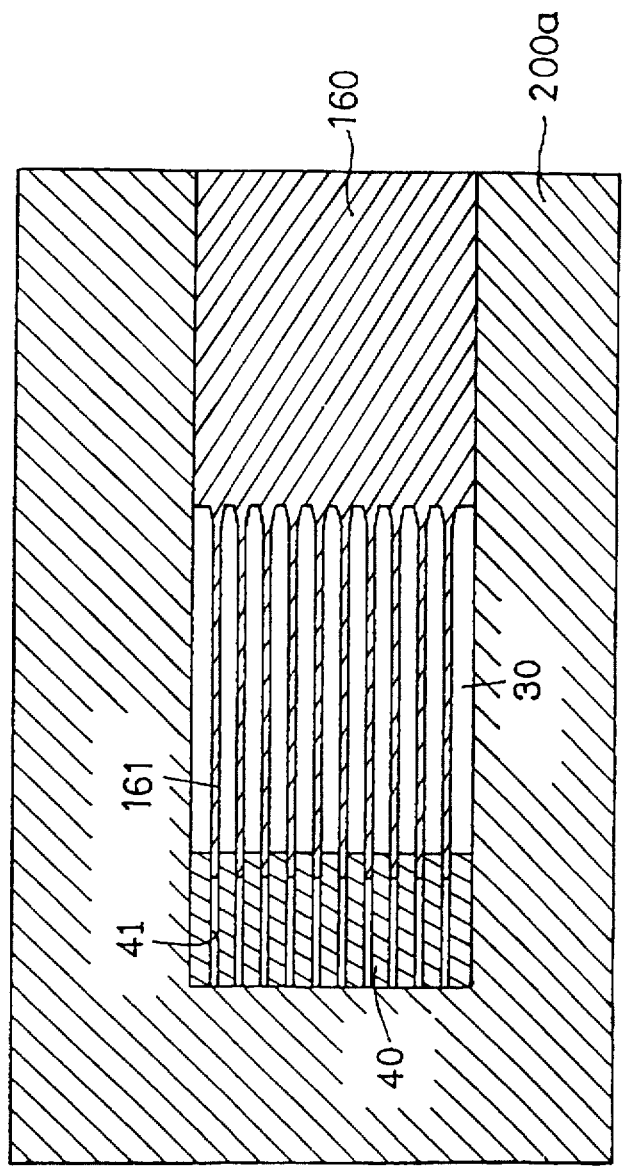

5,780,079

APPARATUS FOR MOLDING A CONNECTOR

FIELD OF THE INVENTION

The present invention relates to an apparatus for molding a connector; and, more particularly, to a molding apparatus capable of molding connectors having different numbers of holes.

DESCRIPTION OF THE PRIOR ART

As is well known, a connector may be used in connecting, e.g., two optical-fiber cables each of which involves at least one optical fiber.

In FIG. 1, there is shown a connector 20 provided with a plurality of holes 21 in each of which an optical fiber 10 is terminated. There is shown in FIG. 2 a manner in which two optical-fiber cables are connected to each other through the connector 20 and a counterpart connector 20' provided also with at least one corresponding hole wherein a counterpart optical fiber 10' is terminated. The optical-fiber cables are connected to each other in such a way that the facing ends of the optical fibers 10, 10' come into a face-to-face contact with each other.

In other words, the number of holes in the connector must be the same as the number of optical fibers to be terminated, necessitating a need to form connectors having various different numbers of holes depending on the number of optical fibers in the optical-fiber cables to be connected.

Such a connector is normally formed by injection molding, and conventionally, a separate molding apparatus is required to form each connector, thereby increasing the production cost of the molding apparatus and hence the connector.

SUMMARY OF THE INVENTION

It is, therefore, a primary object of the invention to provide a molding apparatus capable of molding connectors having different numbers of holes.

In accordance with one aspect of the present invention, there is provided an apparatus for molding a connector, which comprises: a stationary body; a moving body provided with a first and a second sites; a first and a second blocks detachably fixed to the first and the second sites, respectively, the first block having at least one hole and the second block having at least one through-hole corresponding to the first hole; and a core block having at least one core, wherein, when the molding apparatus is closed, the stationary body, the moving body, and the first and the second blocks cooperate to define a cavity, and the core block is interposed between the stationary and the moving bodies in such a way that a leading end of the core fits through the through-hole of the second block and into the hole of the first block.

BRIEF DESCRIPTION OF THE DRAWINGS

The above and other objects and features of the instant invention will become apparent from the following description of preferred embodiments taken in conjunction with the accompanying drawings, in which:

FIGS. 3A and 3B set forth a partial transverse sectional view of an apparatus for molding a connector in accordance with a preferred embodiment of the present invention, and a cross-sectional view thereof taken along the line I—I in FIG. 3A, respectively.

FIGS. 9A and 9B offer a partial transverse sectional view of an apparatus for molding a connector in accordance with another preferred embodiment of the present invention, and a cross-sectional view thereof taken along the line II—II in FIG. 9A, respectively.

DETAILED DESCRIPTION OF THE PREFERRED EMBODIMENTS

Figure 1:
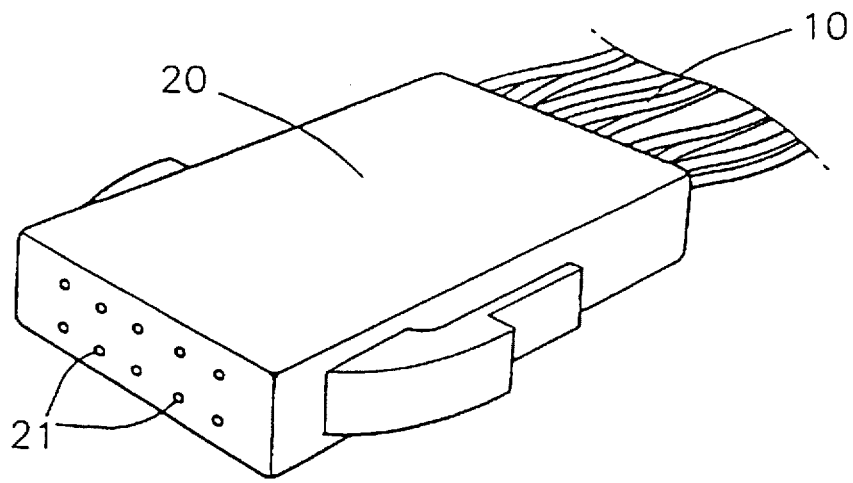
FIG. 1 represents a schematic perspective view of a connector provided with a plurality of holes in each of which an optical fiber is terminated.
Figure 2:
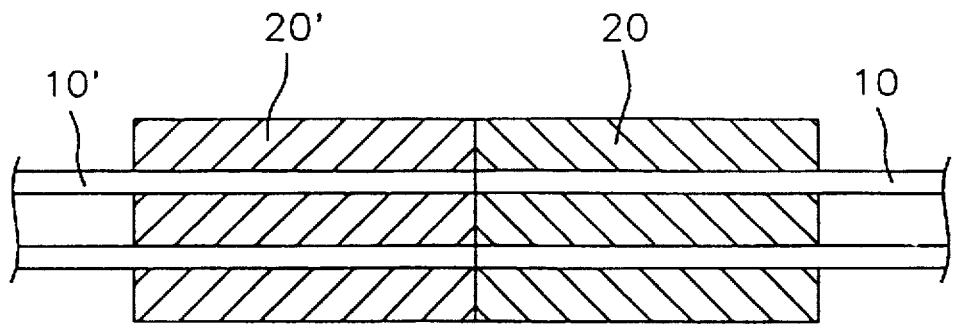
FIG. 2 depicts a cross-sectional view of two connectors coupled to each other, showing that the two facing ends of the optical fibers terminated in the connectors, respectively, come in a face-to-face contact with each other.
Figure 3C:
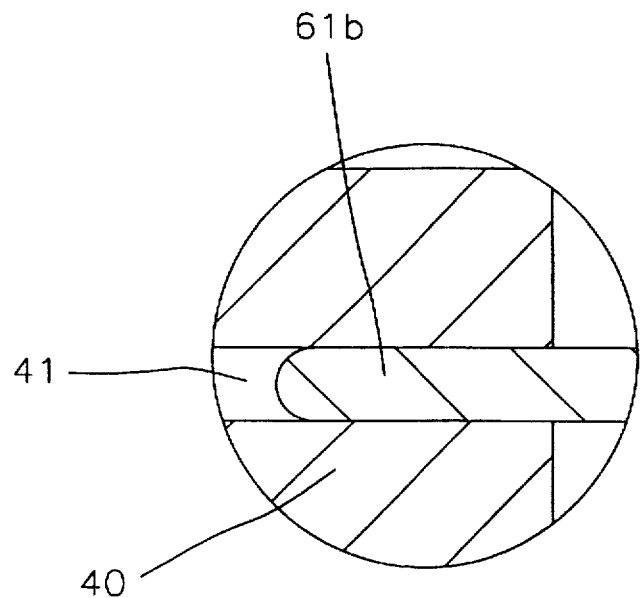
FIGS. 3C and 3D are enlargements of separate portions of FIG. 3A.
Figure 3D:
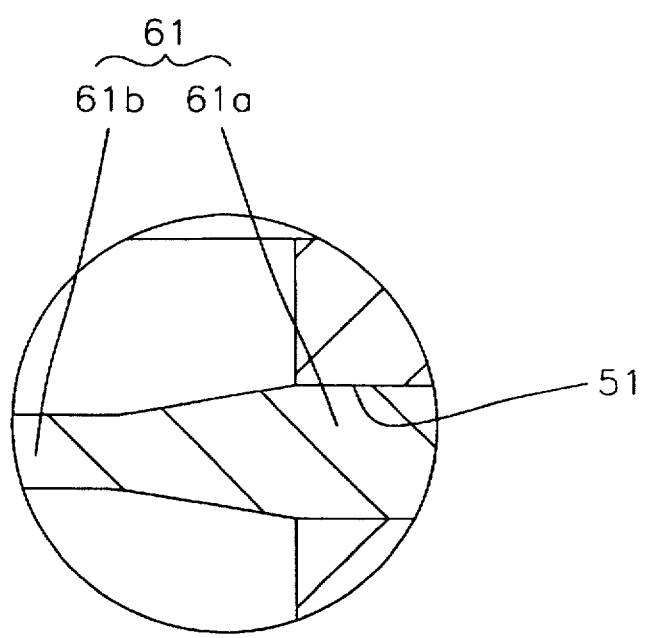
Figure 4A:
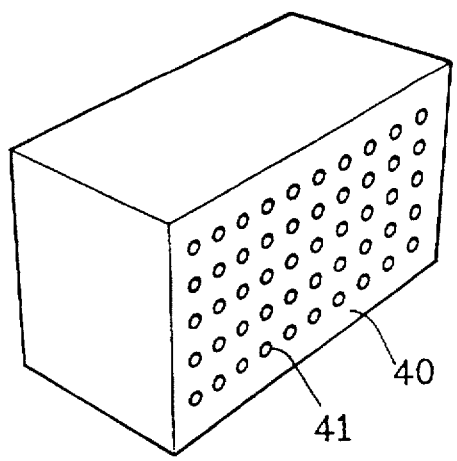
FIGS. 4A to 4C present a perspective view of a first block, a longitudinal sectional view thereof and a perspective view of another first block which is comprised of a plurality of layers, respectively.
Figure 4C:
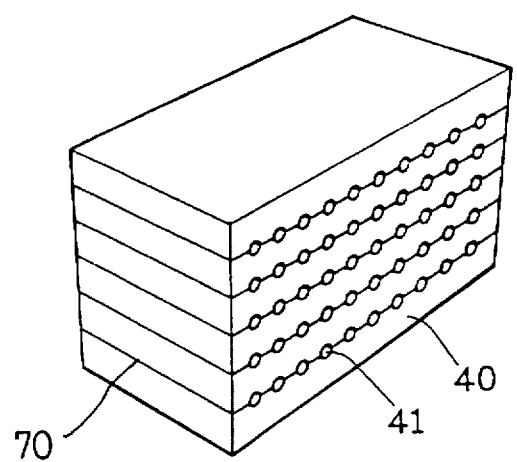
Figure 4B:
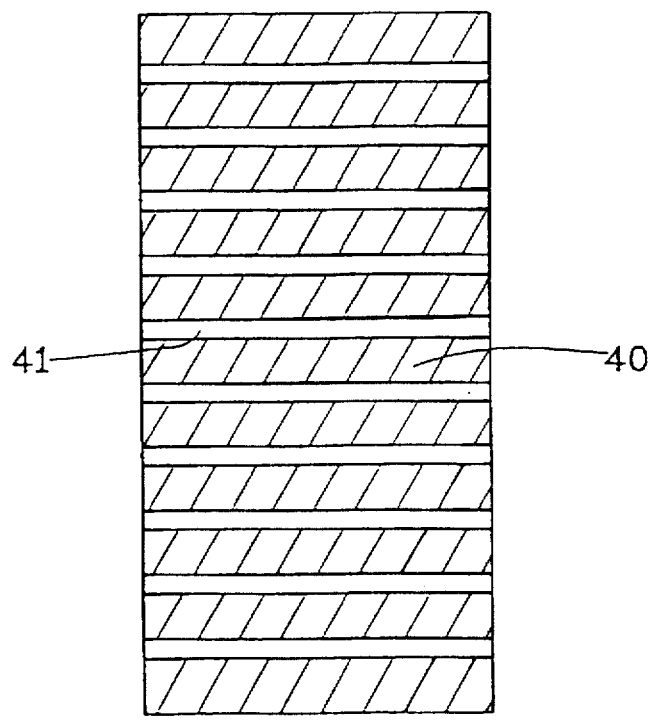
Figure 5A:
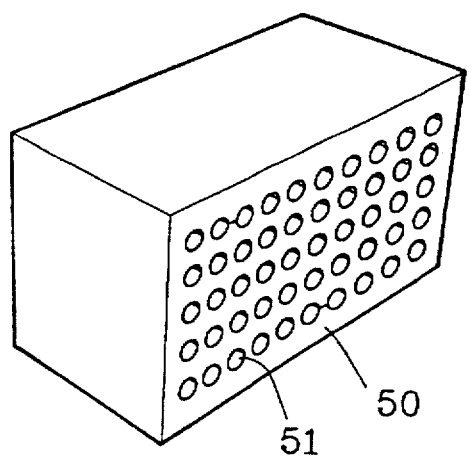
FIGS. 5A to 5C illustrate a perspective view of a second block, a longitudinal sectional view thereof and a perspective view of another second block which is comprised of a plurality of layers, respectively.
Figure 5C:
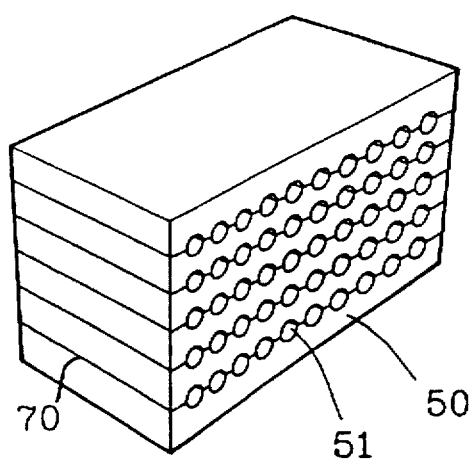
Figure 5B:
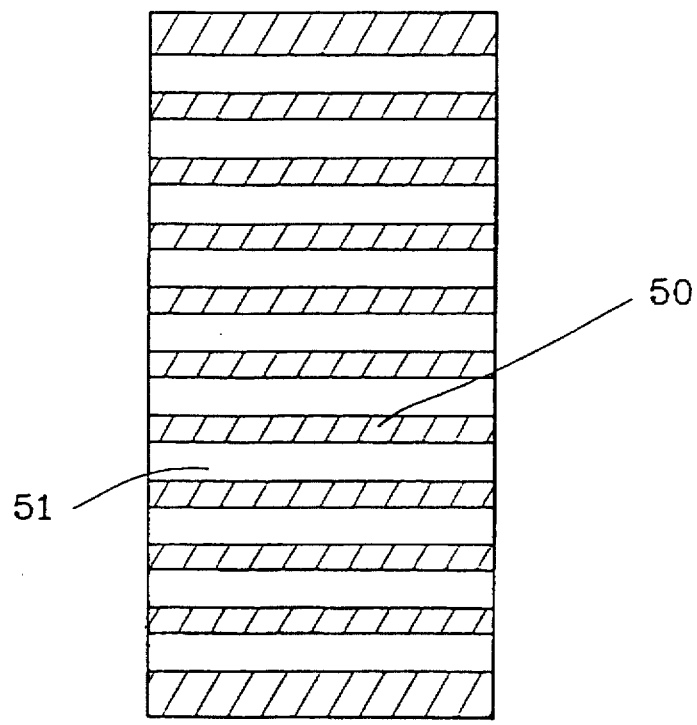

There are shown in FIGS. 3A and 3B a partial transverse sectional view of an apparatus for molding a connector in accordance with a preferred embodiment of the present invention, and a cross-sectional view thereof taken along the line I—I of FIG. 3A.

The connector molding apparatus of the present invention comprises a stationary body 100a, a moving body 100b, a first and a second blocks 40, 50 and a core block 60.

The moving body 100b is provided with a first and a second sites 40a, 50a. The first and the second blocks 40, 50 are detachably fixed on the first and the second sites 40a, 50a, respectively, through an appropriate means, e.g., magnetic material 70. It is preferable that the sites 40a, 50a be trenched for allowing the blocks 40, 50 to be securely fixed thereon.

Referring to FIGS. 4A to 5C, the first block 40 is provided with at least one hole 41 and the second block 50 is provided with at least one through-hole 51 corresponding to the hole 41. The first and the second blocks 40, 50 may each be of one piece (see FIGS. 4A and 5A) or may each be comprised of a plurality of layers stacked and the magnetic material 70 may be interposed between adjacent two layers (see FIGS. 4C and 5C).

Figure 6:
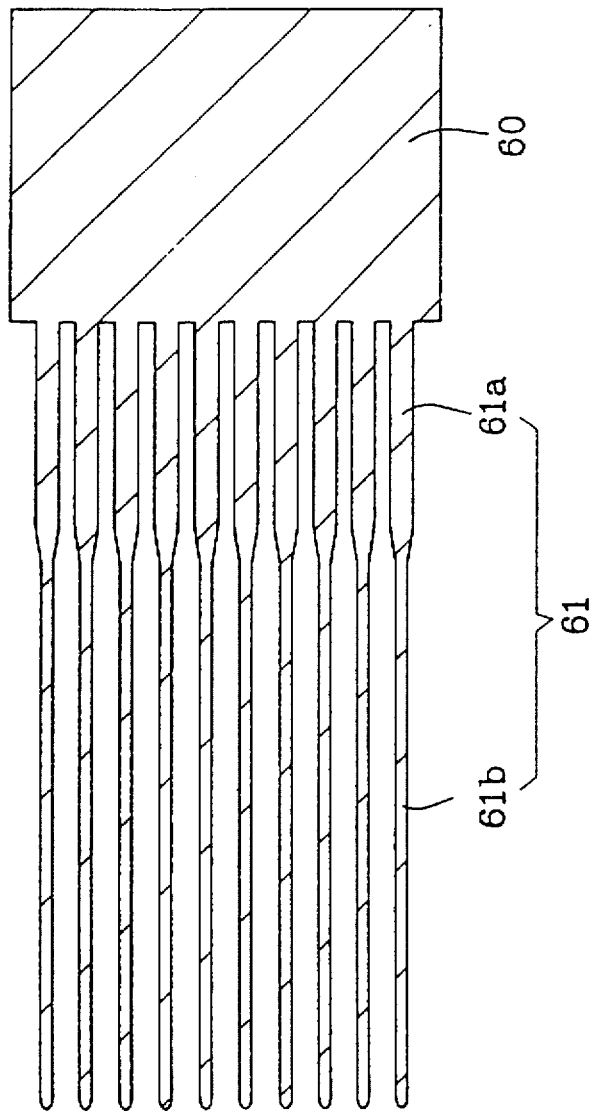
FIG. 6 demonstrates a cross-sectional view of a core block.

Turning now to FIG. 6, the core block 60 is provided with at least one core 61 which is adapted to fit through the through-hole 51 of the second block 50 and into the hole 41 of the first block 40. The core 61 is provided with a guide pin 61a and a needle 61b. The needle 61b coaxially extends from a leading end of the guide pin 61a. The needle 61b has a diameter slightly larger than that of an optical fiber, and the guide pin 61a has a diameter larger than that of the needle 61b.

Operation of the molding apparatus of the present invention will now be described with reference to FIGS. 3A and 3B.

Figure 7A:
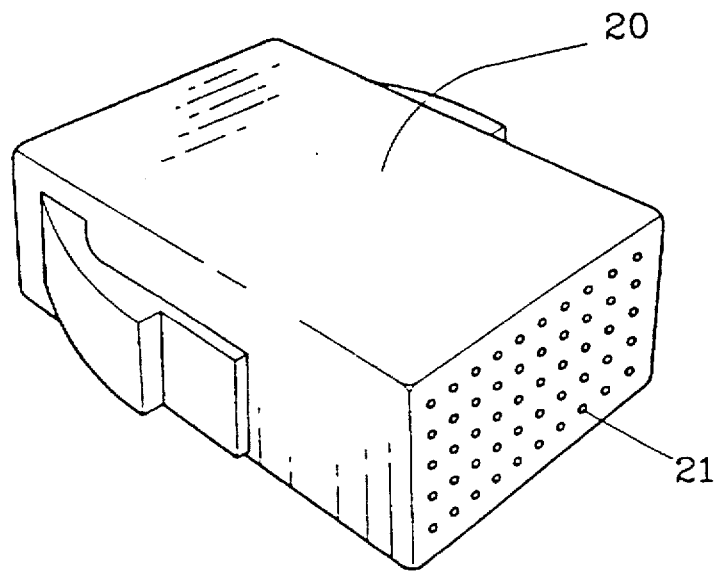
FIGS. 7A and 7B provide a schematic perspective view of a connector provided with a plurality of holes and a cross-sectional view thereof.
Figure 7B:
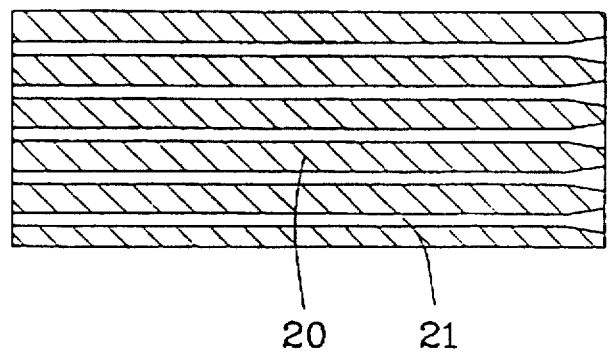

Initially, the first and the second blocks 40, 50 which are each provided with a desired number of holes 41 and through-holes 51 are detachably fixed to the first and the second sites 40a, 50a, respectively. Then, the moving body 100b moves toward the stationary body 100a so that inner surfaces 30a, 30b of the stationary and the moving bodies 100a, 100b and side surfaces of the first and the second blocks 40, 50 which face each other cooperate to define a cavity 30 which will be filled with a molten plastic material. The core block 60 then moves and is interposed between the stationary and the moving bodies in such a way that a leading end of the needle 61b fits through the through-hole 51 of the second block 50 and into the hole 41 of the first block 40. After the molding apparatus is completely closed, a molten plastic material is injected into the cavity 30 through a gate 101 and is then solidified. Subsequently, the molding apparatus is opened in a reverse order, resulting in a connector as shown in FIGS. 7A and 7B.

Figure 8:
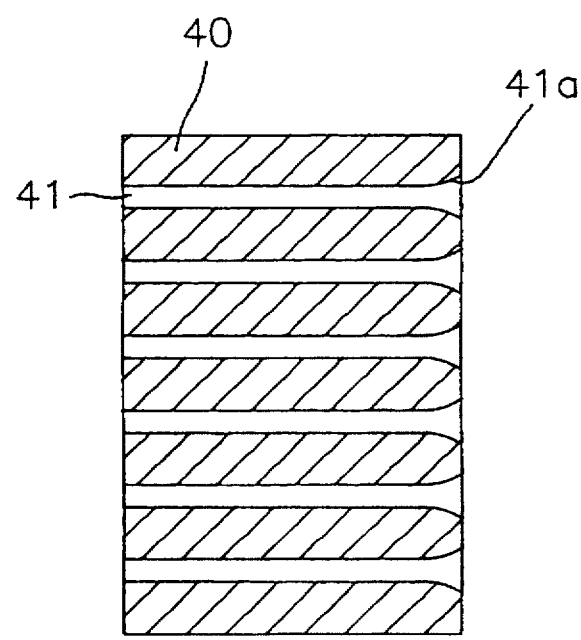
FIG. 8 shows a cross-sectional view of a first block each hole of which has a flared-shape entrance.

In order to facilitate the insertion of the needle 61a into the hole 41 of the first block 40, it is preferable that an entrance 41a of the hole 41 have a flared-shape, as shown in FIG. 8.

In such a molding apparatus of the present invention, the first block 40, the second block 50 and the core block 60 which have a same number of holes 41, through-holes 51 and cores 61, respectively, constitute a set. Accordingly, if it is required to form a connector having a different number of holes, it is possible to make the connector simply by replacing the set of the first and the second blocks 40, 50 and the core block 60 with another set having the desired number of holes 41, through-holes 51 and cores 61. For instance, when the molding apparatus forms a connector for an optical-fiber cable involving ten (10) optical fibers, a set of a first block, a second block and a core block which have 10 holes, 10 through-holes and 10 cores, respectively, is employed, and, when it forms a connector for an optical-fiber cable involving 20 optical fibers, another set of a first block, a second block and a core block which have 20 holes, 20 through-holes and 20 cores, respectively, is employed.

Figure 9C:
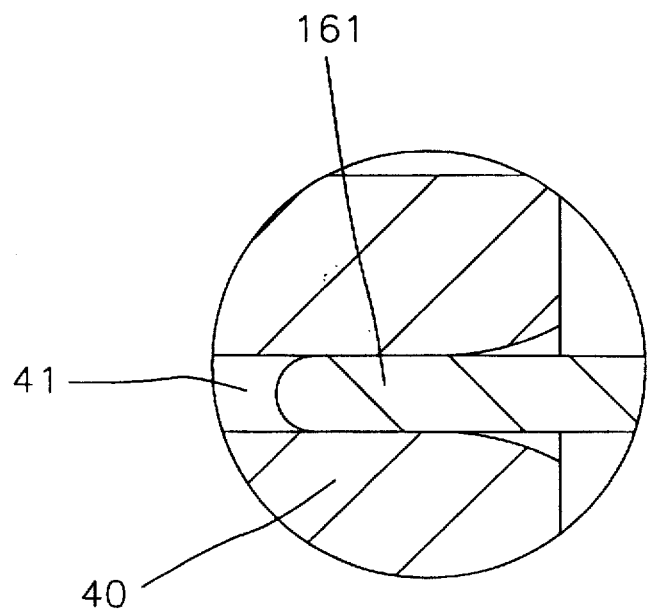
FIGS. 9C and 9D are enlargements of separate portions of FIG. 9A.
Figure 9D:
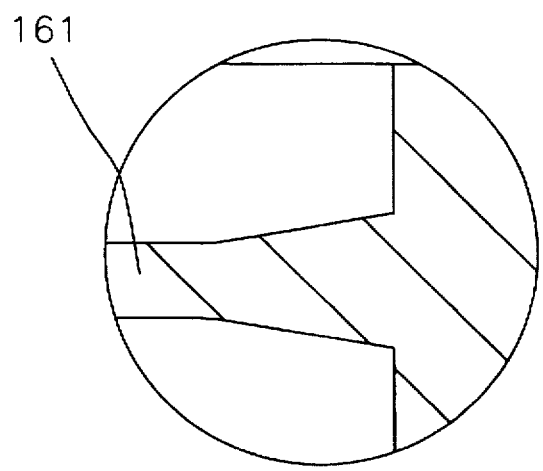

There are shown in FIGS. 9A and 9B a partial transverse sectional view of an apparatus for molding a connector in accordance with a second preferred embodiment of the present invention, and a cross-sectional view thereof taken along the line II—II given in FIG. 9A, respectively.

The connector molding apparatus of the second preferred embodiment of the present invention comprises a stationary body 200a, a moving body 200b, a block 40 and a core block 160. The second preferred embodiment is similar to the first except for the absence of the second block.

In such a molding apparatus, when the molding apparatus is closed, the core block 160 is interposed between the stationary and the moving bodies 200a, 200b in such a way that a leading end of the core 161 fits into the hole of the block and the stationary body 200a, the moving body 200b, the block 40 and the core block 160 cooperate to define a cavity 30 which will be filled with a molten plastic material.

In the above preferred embodiments, although the first and the second blocks are illustrated to be detachably fixed to the moving body, they may be detachably fixed to the stationary body.

While the invention has been shown and described with respect to the preferred embodiments, it will be understood by those skilled in the art that various changes and modifications may be made without departing from the spirit and scope of the invention as defined in the following claims.

What is claimed is:

1. An apparatus for molding a connector, which comprises:

a stationary body;

a moving body provided with a first and a second site;

a first and a second block detachably fixed to the first and the second sites, respectively, the first block having at least one hole and the second block having at least one through-hole corresponding to the hole of the first block; and a core block having at least one core corresponding to the hole of the first block and the through-hole of the second block, wherein, when the molding apparatus is closed, the stationary body, the moving body, and the first and the second blocks cooperate to define a cavity, and a leading end of the core fits through the through-hole of the second block and into the hole of the first block, and wherein the first and the second blocks and the core block are removable for being replaced with another first block, second block and core block having a different number of holes, through-holes and cores respectively.

2. The molding apparatus of claim 1, wherein the first and the second blocks are detachably fixed on the first and the second sites, respectively, through a magnetic material.

3. The molding apparatus of claim 1, wherein an entrance of the hole of the first block is of a flared-shape.

4. The molding apparatus of claim 1, wherein the first block is comprised of a plurality of layers.

5. The molding apparatus of claim 4, wherein a magnetic material is interposed between an adjacent two of said layers.

6. The molding apparatus of claim 1, wherein the second block is comprised of a plurality of layers.

7. The molding apparatus of claim 6, wherein a magnetic material is interposed between an adjacent two of said layers.

8. The molding apparatus of claim 1, wherein the core of the core block is provided with a needle whose diameter is slightly larger than that of an optical fiber and a guide pin whose diameter is larger than that of the needle, the needle coaxially extends from a leading end of the guide pin, wherein, when the molding apparatus is closed, a leading end of the needle fits through the through-hole of the second block and into the hole of the first block and the guide pin is fitted in the through-hole of the second block.

9. The molding apparatus of claim 8, wherein said leading end of the guide pin protrudes from the through-hole of the second block when the molding apparatus is closed.

10. The molding apparatus of claim 1, wherein the first and the second sites are trenched.

* * * * *